United States Patent [19]

Moskvin

[11] Patent Number: 5,012,762
[45] Date of Patent: May 7, 1991

[54] DEVICE FOR DETERMINING THE INDEX OF INDIVIDUAL PRODUCTIVITY AND FEED RATION OF ANIMALS

[76] Inventor: Gennady A. Moskvin, ulitsa Satixmes,49.kv.59, Latviiskaya SSR, Elgave, U.S.S.R.

[21] Appl. No.: 449,875
[22] PCT Filed: Apr. 11, 1989
[86] PCT No.: PCT/SU89/00092
  § 371 Date: Jan. 9, 1990
  § 102(e) Date: Jan. 9, 1990
[87] PCT Pub. No.: WO89/10687
  PCT Pub. Date: Nov. 16, 1989

[30] Foreign Application Priority Data
  May 5, 1988 [SU] U.S.S.R. ............... 4413033

[51] Int. Cl.$^5$ ................................. A01J 5/00
[52] U.S. Cl. ................. 119/14.18; 119/14.17
[58] Field of Search ............... 119/14.08, 14.14, 14.18, 119/14.17, 14.15

[56] References Cited

U.S. PATENT DOCUMENTS

| 2,661,122 | 12/1953 | Peterson | 119/14.17 |
| 3,111,113 | 11/1963 | Jaquith | 119/14.17 |
| 3,841,756 | 10/1974 | Grochowicz | 119/14.17 |
| 3,977,362 | 8/1976 | Jaquith | 119/14.17 |
| 4,231,324 | 11/1980 | Schletter | 119/14.17 |
| 4,348,984 | 9/1982 | Brayer | 119/14.15 |
| 4,513,830 | 4/1985 | Persheck et al. | 119/14.17 |
| 4,745,880 | 5/1988 | Kummer | 119/14.17 |

FOREIGN PATENT DOCUMENTS

| 369881 | 4/1973 | U.S.S.R. | 119/14.17 |
| 852282 | 8/1979 | U.S.S.R. | 119/14.15 |
| 1159521 | 6/1985 | U.S.S.R. | |
| 1305587 | 2/1973 | United Kingdom | 119/14.17 |

Primary Examiner—Paul J. Hirsch
Attorney, Agent, or Firm—Burgess, Ryan & Wayne

[57] ABSTRACT

The device comprises a milk storage container (1) connected to a milking apparatus (3). Arranged inside the container (1) is milk level sensor made in the form of a float (15) with a magnet (16), through which a cylindrical body (17) is extended. Disposed one above another in the body (17) are gercons (18, $25_1$, $25_2$, ... $25_n$) of the milk level identifying unit and of a programming unit: the gercons interact with the magnet (16) of the float (15) and are connected to the respective inputs of the computing unit (21) secured on the tank (1). The gercons (18, $25_1$, $25_2$ ... $25_n$) are installed at a distance equal to the value of the optimum feed ration of the animals corresponding to the index of their individual productivity.

3 Claims, 3 Drawing Sheets

DEVICE FOR DETERMINING THE INDEX OF INDIVIDUAL PRODUCTIVITY AND FEED RATION OF ANIMALS

BACKGROUND OF THE INVENTION (1) Field of the Invention

The present invention relates to milking technology and, more specifically, the invention relates to a device for determining the index at individual productivity and feed ration of animals.

To carry out regular and efficient, zootechnical, veterinary and selection work with a dairy farm herd, it is necessary to have some initial information for setting up individual feed rates for animals depending on their productivity. In this case the calculation of individual milk yield from each cow is a labour-consuming intermediate operation for determining a parameter making it possible to evaluate the productivity of each animal by a preset index, which is then used for determining the optimum individual feed rates, mainly concentrated food rations.

The operative setup of an optimum ration of concentrated food depending on the animal productivity is necessary for increasing the milk yield (the genetic potential productivity of each animal is utilized more effectively), taking into account the fact that the cost of milk production at farms is up to 75% of the expenses for such a production. In addition, the control of the feeding procedure requires storage of data files on daily milk yields and feed rations during lactation period. Therefore, in organization of zootechnical, veterinary and selection work at dairy farms, it is important to automate the acquisition and processing of information on each animal and to reduce the amount of manual operations on determining the index of productivity and individual food ration. The type of information submitted should be convenient for its operative use by the farm stock breeders.

(2) Background of the Related Art

Known in the art is an individual milking unit (an advertisement brochure of the Rezenkne Milking Unit Works "Agregat inuividualnogo doeniya AID-1", 1984) having a cylindrical container for collection of milk connected to the milking apparatus.

This device does not allow one to determine the index of individual productivity and feed rations and, therefore, requires additional labour-consuming operations increasing the cost.

Also known in the art is a milking apparatus with digital recording of the milk yield ("Dojarka z cytrowa rejestracia przebiegu dojenia", Maszyny i ciagniki rolnicze, Polska, 1987, 6, part 33, No. 1, pp. 21-23) comprising a cylindrical container for collection of the milk yield communications with a milking apparatus, a float provided inside the container, a rope connected to a counterweight through a drive roller coupled to the axis of a rotary-pulse converter connected to an electronic unit.

After the milking apparatus has been put into operation, the milk from the milking apparatus flows into the cylindrical container and acts on the float which through the rope rotates the drive roller thus actuating the rotary-pulse converter. The latter sends pulses to the electronic recording unit thus recording the individual milk yield from every cow depending on the amount of milk in the container when milking each animal.

This apparatus determines only the traditional parameter - milk yield as a primary parameter taking into account the individual characteristics of each animal, however, it does not provide a possibility of determining the final parameters required for zooveterinary and selection work, i.e. the index of individual productivity and feed ration of the animals, and this restricts the field of its application and requires additional labour consumption.

Furthermore, the milking apparatus has a complex design and makes use of the imperfect contact principle of data recording based on the friction force, e.g. in roller supports and in contact of the float rope with these rollers. This results in errors in the process of determining the milk yield and its digital recording by means of the electronic unit. The absence of a computing unit with a control desk limits the functional possibilities of the apparatus in the process of its preliminary adjustment and monitoring of its readings. The absence of a computing unit does not allow one to correct the reading taking into account the properties of the medium being measured and the milking apparatus design and also makes it difficult to calibrate the cylindrical container. As a result, the zootechnical, veterinary and selection work is hindered, since such a job imposes high requirements on the accuracy and reliability of the initial data being processed in an ordinary or computer-aided dairy farm control system.

Also known in the art is a device for recording the amount of milk yield (SU, A, 1109092) comprising a cylindrical milk container connected to the milking apparatus and to a milk conduit through a milk suction branch pipe. Arranged inside the cylindrical container is milk level sensor made in the form of a float with a magnet. The milk level identifying unit is made in the form of a group of gercons mounted along the height of the cylindrical container and capable of interacting with the float magnet. The outputs of the gercons are connected to the inputs of a computing unit secured on the cylindrical container.

In the process of machine milking and filling the container with milk, the float rises up together with the milk level. The magnetic field of the annular magnet of the rising float acts in succession on the individual gercons mounted outside the cylindrical container along a helical line.

As soon as the gercon operates, the control signal is sent to the computing unit, which calculates the milk yield of every cow. This information is presented in a digital code; the computing unit is programmed by the operator from the control desk.

This prior art device is also not adapted for determining the index of individual productivity and the feeding standards for the animals, since it acquires primary information - milk yield and not the corresponding index of individual productivity. Therefore, additional processing of this primary information (milk yield) is necessary to find the index of individual productivity.

Furthermore, the prior art device does not make it possible to determine the feed ration for the animals.

The manual programming of the computing unit (no automatic programming means are available) complicates the operation of the device and is not free from a possibility of introducing errors by the operators, which errors reduce the reliability of the results obtained. Simultaneous operation of the personnel with several milking apparatus without automatic programming of the computing unit reduces the productivity of labour.

The absence of an element for stabilization of the milk level, when milking nervous cows may lead to erroneous operation of the gercons and distortion of the data obtained, which may disorient the farm personnel in determining a real index of individual productivity and correct feed rations.

SUMMARY OF THE INVENTION

The main object of the invention is to provide a device for determining the index of individual productivity and animal feed ration, which is equipped with an additional unit making it possible to simplify the operation, to widen the functional possibilities of the device and to provide efficient and operative zootechnical and selection work with each animal at a diary farm in a form easy for the operating personnel.

This object is attained by providing a device for determining the index of individual productivity and animal feed ration comprising a milk storage container connected to a milking apparatus and to a milk conduit through a milk suction pipe, a milk level sensor made in the form of a float with a magnet located inside the milk storage container, a computing unit secured on the milk storage container, and a unit for identifying the milk level in the milk storage container made in the form of a group of gercons installed one above the other along the height of the milk storage container, said gercons interacting with the float magnet and being connected to the respective inputs of the computing unit; according to the invention, the device is equipped with a programming unit made in the form of a group of gercons disposed vertically beneath the milk level identification unit in the milk storage container in a common housing arranged in the milk storage container and spaced from each other for a distance equal to the value of the optimum animal feed ration corresponding to the index of their individual productivity; the gercons of the programming unit are connected to the respective inputs of the computing unit.

To prevent possible distortion of information due to erroneous operation of the gercons, when milking a nervous cow, it is expedient that the milk storage container is equipped with a milk level stabilization element made in the form of an elastic sucking disk secured to the container bottom.

It is also expedient that the bottom of the milk storage container has a recess in its central part accommodating a programming unit; the geometric size of the recess must exceed the geometric size of the float. This allows one to minimize the quantity of milk necessary for performing the operation of automatic programming in the process of milking the cow.

BRIEF DESCRIPTION OF THE DRAWINGS

The invention is further described by way of example with reference to the accompanying drawings, in which.

BEST MODE FOR CARRYING OUT THE INVENTION

Figure 1:
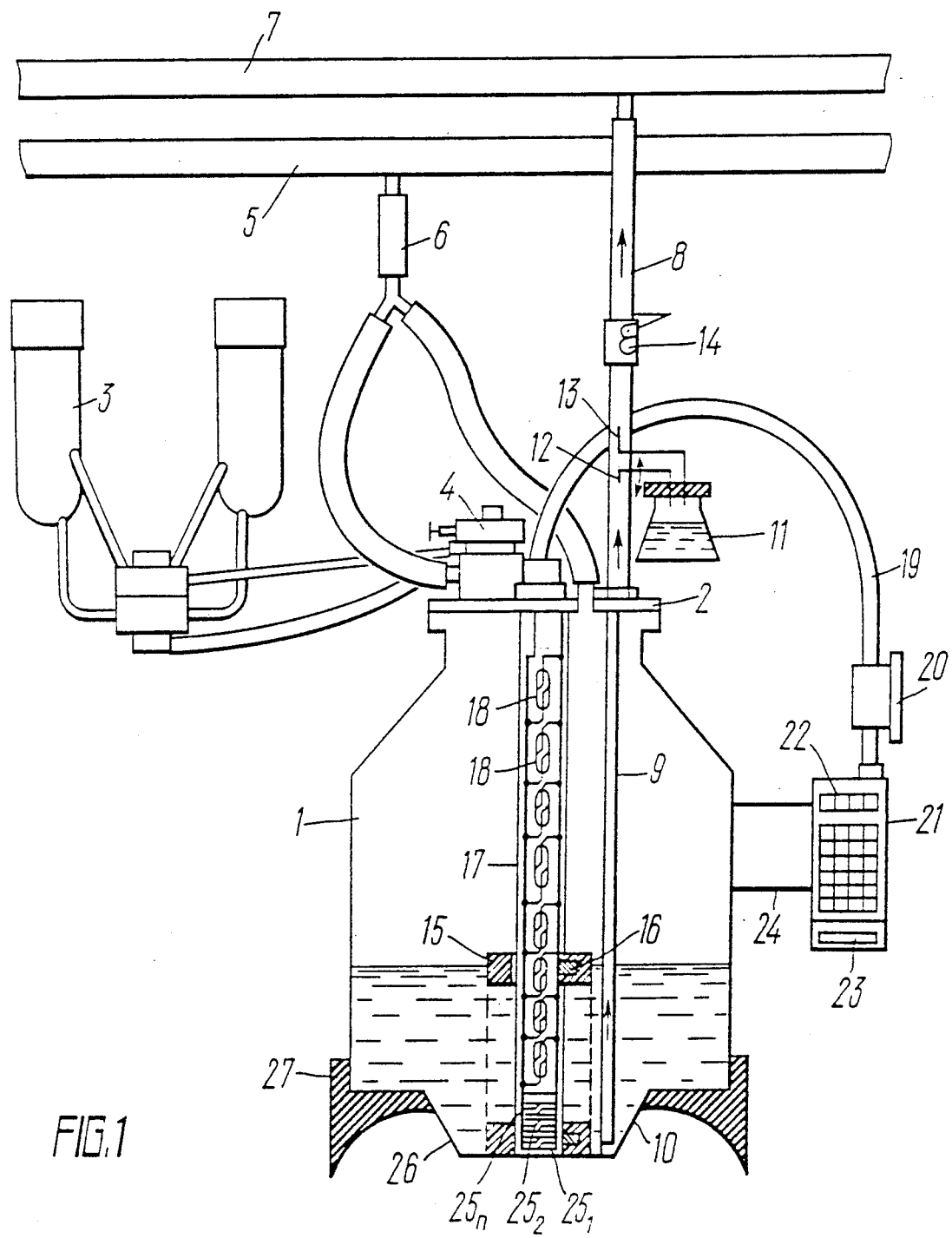
FIG.1 is a general view of the device for determining the index of individual productivity and animal feed ration, a longitudinal section, according to the invention.

The device for determining the index of individual productivity and animal feed ration, according to the invention, comprises a cylindrical milk storage container 1 with a cover 2 communicating with a milking apparatus 3. Mounted on the cover 2 is a pulser 4. The milking apparatus 3 and the container 1 are connected to a vacuum line 5 of the milking apparatus (not shown) through a hose 6. The container 1 is connected to a milk conduit 7 through a milk suction pipe 8 provided with a hollow tip 9 put into the container 1 to the contact with the bottom 10 through its end cut at an angle of 45° for transportation of milk without forming plugs due to pulsation. Mounted on the rigid pipe 8 installed vertically is a milk sampler 11 for taking samples for laboratory analysis. The sampler includes an L-shaped hollow sampling tube 12 mounted normal to the pipe 8 with a possibility of rotation about its axis and having an end cut at an angle of 45° and facing the milk flow, when sucking milk from the container 1. The air from the sampler 11 being filled with milk is removed through a hollow S-shaped tube 13 mounted in the cut part of the pipe 8 with its end oriented in the direction opposite to the direction of the milk stream being sucked from the container 1. A cock 14 closed in the process of milking is used for feeding the milk from the container 1 into the milk conduit 7. The container 1 is provided with a milk level sensor made in the form of a float 15 with a magnet 16. Mounted inside the container 1 in a vertical position is a cylindrical body 17 made of a nonmagnetic material, e.g. aluminium, and extending through the float 15 with a magnet 16. The body 17 accommodates a group of gercons or switch devices 18 of the milk level identifying unit. The gercons follow each other along the height of the body 17 with a spacing equal to the value of optimum feed ration corresponding to the index of individual productivity of the animals. The gercons 18 of the milk level identifying unit through a bus 19 and a connector 20 are connected to the respective inputs of the computing unit 21 having a unit for recording the feed rate or index of individual productivity, said unit being a digital indicator, and to a milking time indicator unit 23. The computing unit 21 is secured to the container 1 by means of a bracket 24.

The automatic entry of a program into the computing unit 21 is effected by a programming unit made in the form of a group of gercons or switch devices $25_1$, $25_2$, ..., $25_n$, where n is the number of operations for programming the computing unit 21. The gercons $25_1$, $25_2$, ..., $25_n$ of the programming unit are arranged in a common body 17 placed below the gercons 18 of the milk level identifying unit in the recess 26 made in the central part of the bottom of the container 1; the geometric size of the recess 26 exceeds that of the float 15 with a magnet 16. The gercons 25, $25_2$, ..., $25_n$ are connected through the bus 19 and connector 20 to the respective inputs of the computing unit 21.

When milking nervous cows, the reliable milk level data are provided by means of a milk level stabilization element made in the form of an elastic sucker 27 sticking to the bottom 10 of the container 1.

The computing unit 21 comprises a microprocessor 28 (FIG.2) with buses 29, 30, 31 and a switch 32; a resister unit 33; a clock frequency generator 34 and a control panel 35.

The microprocessor 28 (FIG.3) comprises a control unit 36, a memory unit 37, and a computer unit 38. The control panel 35 of the computing unit 21 (FIG.1) consists of a matrix field of a digital abbreviation (from 0 to 9) and a special abbreviation, as well as matrixes for entry of the programs, arithmetic operations, reset of the digital indicator 22 (FIG.3), connection and disconnection of the milking time indicator unit 23, connection and disconnection of an audio signalling device, and switches of operating modes of the computing unit 21 (FIG. 1).

The proposed device for determining the index of individual productivity and animal feed ration operates as follows.

The cylindrical milk storage container (FIG.1) for milk collection is secured on the floor in the milking zone by means of the sucker 27, and the milking apparatus 3 is connected to the teats of the cow udder. The container 1 is connected to the milk conduit 7 through the pipe 8 and to the vacuum line 5 of the milking apparatus through the hose 6, the cock 14 being closed.

The time of sending audio signals, when the milking process comes to its final step, is preset on the control panel 35 (FIG.2) of the computing unit 21. This signal will indicate that the operator's presence is required. This is necessary when the operator serves several milking apparatus 3 connected to cows and helps him to come from one animal to another in a reasonable way to prevent "dry" milking causing udder sickness. After the program of operation of the milking time indication unit 23 has been entered and the supply voltage has been applied to the computing unit 21, the device is ready for operation in an automatic mode.

In the process of milking the milk flows into the container 1 and raises the float 15 with a magnet 16. The magnetic field produced by the magnet 16 of the float 15 acts on the gercons $25_1$, $25_2$, ... $25_n$ of the programming unit closing their contacts thereby making the contacts of the respective cells of the matrix field of the control panel 35 (FIG.2) of the computing unit 21 (FIG.1). As the float 15 with a magnet 16 rises along the body 17, the cycle of automatic programming of the computing unit 21 starts from setting the register of the indicator 22 to its zero position (operation "reset") under the effect of the magnetic field of the magnet 16 on the gercon $25_1$ of the programming unit.

The float 15 with a magnet 16 rising with the milk level in the container 1 reaches the level of the gercon $25_2$ coupled to the contacts of the control panel 35 (FIG.2) of the computing unit 21 (FIG.1) corresponding to putting digit 1 into the indicator register. This digit will indicate a number of the index of individual productivity or feeding standard for an individual animal determined in the process of current milking.

Figure 2:
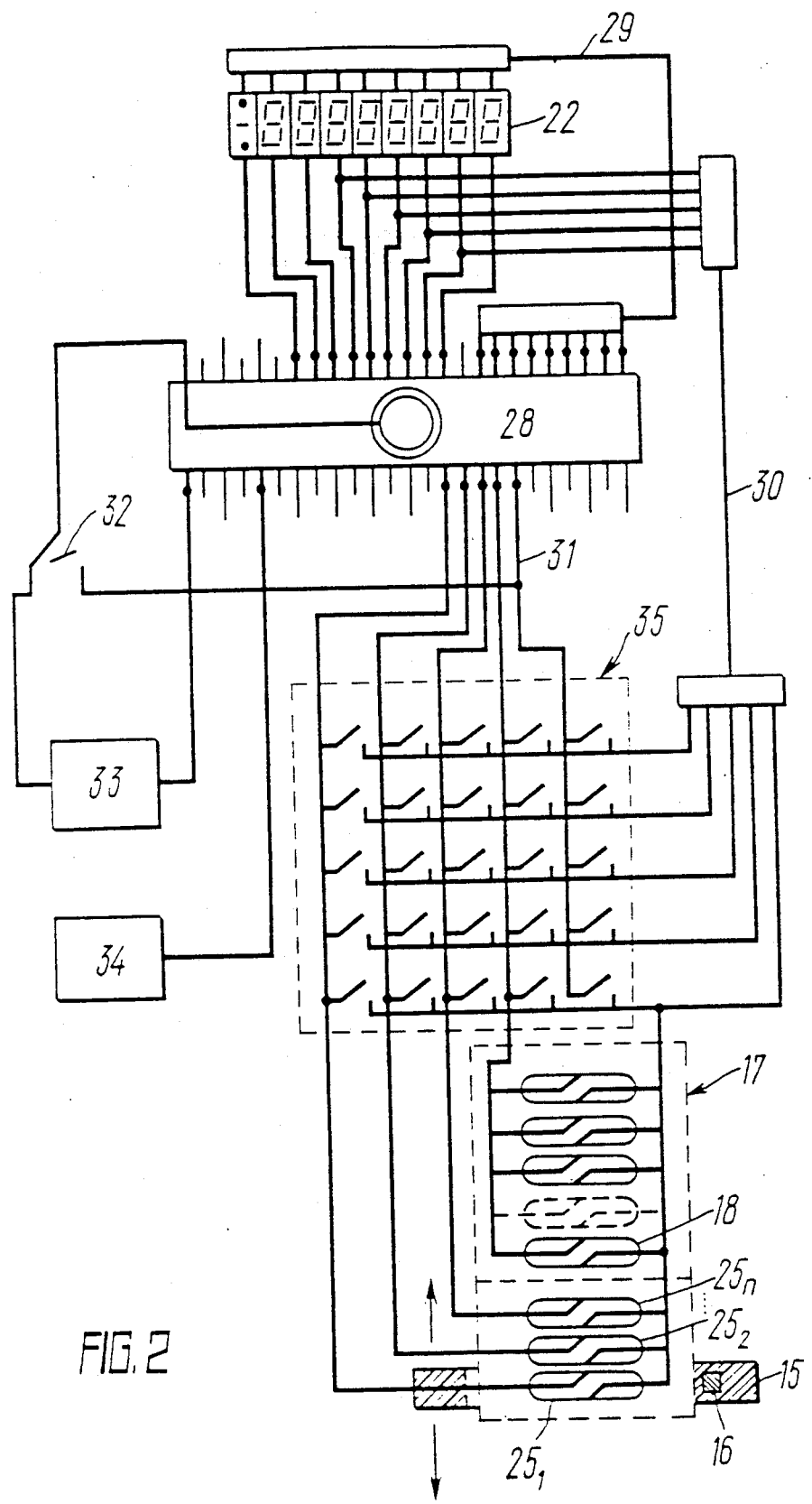
FIG.2 is a block diagram of connection of the programming unit and the milk level identifying unit in the milk storage container to the computing unit, according to the invention.

The amount of milk required for effecting the autoprogramming operations is usually equal to 150-200 ml. This is enough for definite identification of the beginning of the milking process. From the point of view of physiology this means that the process of conditionally-reflective milk allowance is adequate to the process of mechanical milk allowance made by the milking apparatus 3 in the initial phase of the mechanical milking. The identification of the beginning of the process of active milk allowance makes it possible to eliminate the time of false mechanical milk allowance, which not always immediately transforms into the conditionally-reflective milk allowance (e.g. due non-optimal milking conditions, the state of health of the animal, painful feeling of the udder teats, etc.). As a result, repeated false milk allowances are possible, while the interval between them must not be included into the total time of mechanical milking, since the selection of animals requires "pure" milking time determining the intensity of milk "letting down" and fitness of each individual animal to mechanical milking. Therefore, the programming unit may include additional gercons $25_3$, ..., $25_n$ and so on for switching on and off the unit 23 indicating the milking time of each animal. In this case the corresponding gercon $25_1$, $25_2$, or ..., $25_n$ controlling the operation of the milking time indicator unit 23 is coupled to the corresponding contact of the matrix of the panel 35 (FIG.2).

Figure 3:
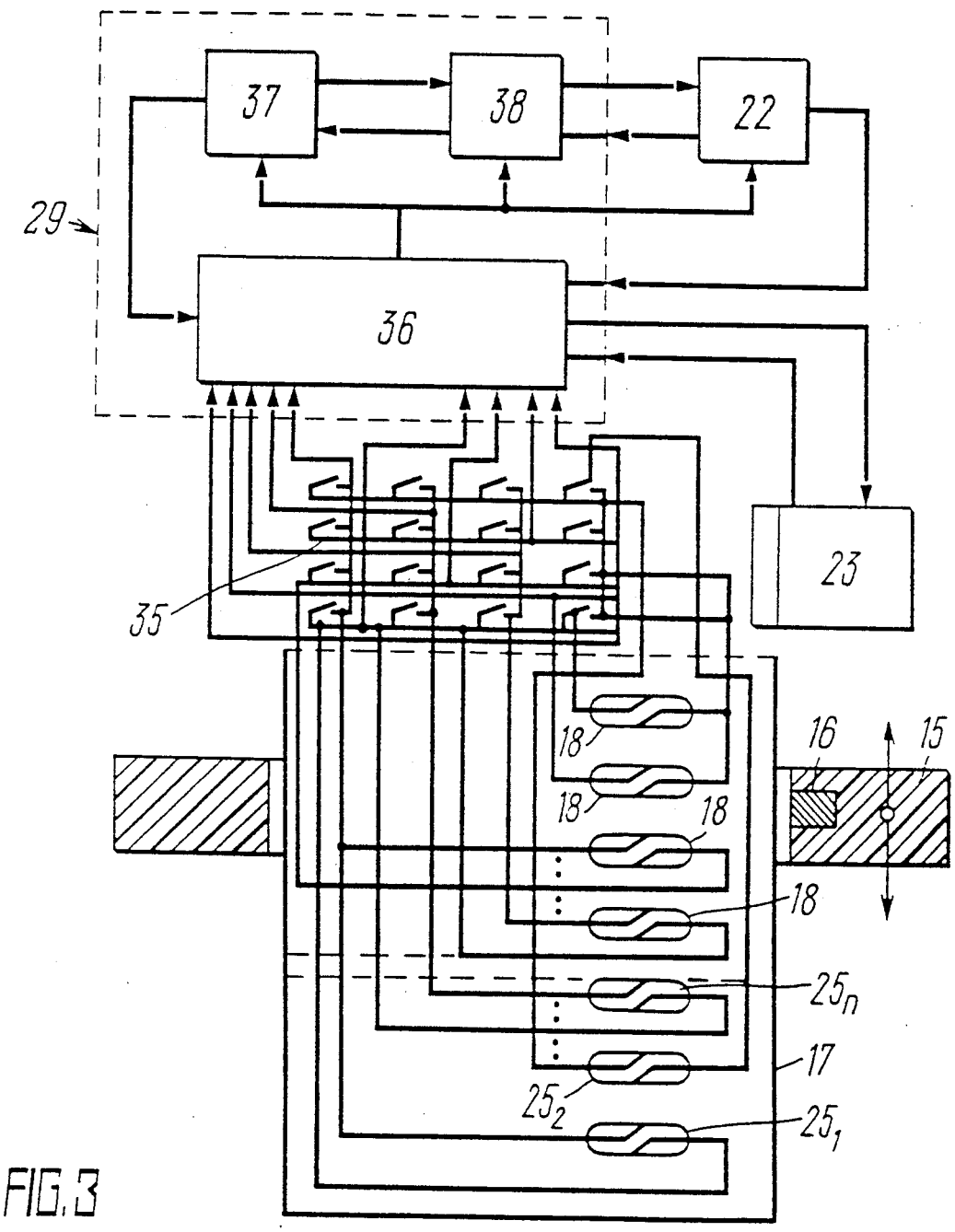
FIG.3 is a block/functional diagram of the computing unit with an interface connecting the gercons of the milk level identifying unit in the milk storage container, according to the invention.

The cycle of autoprogramming of the computing unit 21 (FIG.1) is terminated by entering a program of arithmetic operation "addition" corresponding to the level of location of the gercon $25_n$ coupled to the respective contact of the "addition" matrix of the panel 35 (FIGS. 2,3) of the computing unit 21 (FIG.1). The magnet 16 of the float 15 acts with its magnetic field on the gercon $25_n$ and makes its contacts thus closing the respective contact of the "addition" matrix. The microprocessor 28 (FIG.2) automatically identifies the state of this matrix and puts this arithmetic operation into a calculation unit 38 (FIG.3).

Then the milk will reach the level of the milk identification unit with gercons 18 (FIG.1) coupled to the contact for performing the arithmetic operations shown in the process of automatic programming of the programming unit, and the operation of the milk level identification unit is effected similarly to the operation of the programming unit. Since the milk level identification unit consists of a group of gercons 18 connected in parallel and disposed along the height of the body 17 at different levels corresponding to the groups of identification of the index of individual productivity and feeding standard, the increase of the milk level and the movement of the floating magnet 16 along the wall of the body 17 is accompanied by a process of making the contacts of the group of gercons 18 and, therefore, by closing the "calculate the result" contacts, which, like in the previous operations, are decoded by the microprocessor 28 (FIG.2), and the indicator 22 shows digital values (corresponding to the preset groups of productivity) of indexes of individual productivity and feeding standards. The distance between the gercons 18 corresponds to the intervals between the productivity groups, e.g. according to the Table below.

For practical work it is enough to have five groups of animal productivity, therefore, the milk level identification unit may have only five gercons 18. This simplifies its construction and operation.

| milk yield, kg | Standards for concentrated food per kg of milk | | Index of feed rotation |
| --- | --- | --- | --- |
| | Productivity index | Feed ration dose, g | |
| up to 10 | 1 | 90-100 | 1 |
| 10-15 | 2 | 100-150 | 2 |
| 15-20 | 3 | 150-200 | 3 |
| 20-25 | 4 | 200-300 | 4 |
| 25-30 | 5 | 300-350 | 5 |

The signal sent by the milking time indicator unit 23 programmed for indication of the final milking step allows the operator to carry out the final milking step, to remove the milking cups of the milking apparatus 3 and to record the productivity and feed ration, as well as the total time of milking by the milking time indicator unit 23.

In order to empty the container 1 filled with milk from one cow, the cock 14 is opened and the space of the cylindrical container 1 is communicated with the milk conduit under vacuum. In this case the milk is sucked through a hollow tip 9 and the pipe 8 into the milk conduit 7 and then is transported via this conduit to reprocessing machinery of the diary. In the process of suction of milk through the pipe 8 milk samples for analysis are taken from each cow using the pipe 12 of the sampler 11. A portion of milk taken into the sampler 11 is equal to 1-2% of the total amount of milk. This fraction is controlled by turning the pipe 12 about its axis so that the end face of the pipe 12 cut at 45° relative to the milk flow being sucked from the container 1 acquires a lower or higher cross-sectional area. This increases the sampling accuracy since the samples are taken from a continuous stream of milk (and not from a pulsing one).

As the container 1 is being emptied, the milk level decreases, the float 15 with a magnet 16 comes to the bottom of the container 1, and the magnetic field of the magnet 16 acts on the gercon 25 closing its contact thus closing the associated "reset" contact of the matrix of the control panel 35 (FIGS. 2,3) of the computing unit 21 (FIG.1). The microprocessor 28 (FIG.2) identifies the state of this matrix and resets the resisters of the indicator 22 and milking time indicator unit 23 thus preparing the computing unit 21 (FIG.1) for operation during the milking of the next cow with the help of the milking apparatus 3, and the process of automatic determination of the individual productivity index and feed ration is repeated.

To facilitate the operator's job and to monitor the consumption of concentrated food, the computing unit 21 can automatically recalculate the productivity index into a respective milk yield or into a value of feed rate expressed directly in measuring units: liters, grams, kilograms, etc. depending on the technique accepted at the dairy farm. To this end, the computing unit 21 can be reprogrammed, and this significantly widens the functional facilities of the system without additional cost.

As a result, the device for determining the index of individual productivity and animal feed ration makes it possible to improve the quality of zootechnical, veterinary and selection work with animal individually thus assisting in optimum utilization of the genetic productivity potential and in an increase of the milk yield. Furthermore, the device makes it possible to save food due to its rational utilization.

The device is simple in design and operation and makes it possible to automate a very labour-consuming process of getting objective information on the condition of each animal, which is also required for establishing an effective feedback in the computer-aided system of controlling a dairy farm. This device can be connected to an automatic control system of the farm through a connector 20 so that the device can be used in computing networks of a different hierarchy level.

The proposed device makes it possible to automate the complex of operations on zootechnical, veterinary and selection work including determining the primary milk yield parameters on each animal and the data to determine the index of individual productivity and optimum feed ration of the animals in accordance with the index of their productivity.

The proposed device features a wide functional possibilities since it provides all necessary data (milk yield, milking time and intensity, automatic sampling for analysis) for automatic selection of highly productive animals, determining their individual productivity and optimum feed ration.

The reliability of readings in this device is provided by its simple design, automatic programming and by the use of an element stabilizing the milk level in the cylindrical container 1. A small amount of gercons $25_1$, $25_2$, . . . , $25_n$ in the milk level identification unit and programming unit, as well as simple application software of the computing unit 21 provide simple and easy service of the device by personnel having no skill in the computer programming.

The proposed device makes a successful use of adaptive possibilities in control of animals directed to better use of their genetic productivity potential, since the device gives well-grounded recommendations on optimum distribution of feed ration requiring no additional processing. This advisory information is displayed in a popular form—digits from 1 to 10.

The device saves food because it takes into account the real level of productivity of each animal in accordance with the stage of its lactation, therefore, overfeeding or underfeeding of the animal does not take place.

The presence of an element for monitoring the final milking step makes it possible to record the presence or absence of repeated tolerances in selection of highly productive cows; this knowledge is important for adapting the animal to the mechanical milking.

Industrial Applicability

The present invention can be used for creating a novel promising class of "intellectual" milk yield measuring instruments intended for automated zootechnical, veterinary and selection work with animals, and for choosing highly productive food when stabling and mechanically milking the animals.

The invention can be used with any type of milking apparatus, in which the milk is collected into containers, and makes it possible to determine the individual ration of the animals in accordance with the level of their individual productivity.

We claim:
1. A device for determining the index of individual productivity and animal feed ration, comprising:
   a milk storage container;
   a milking apparatus fluidly connected to said milk storage container;
   a milk conduit fluidly connected to said milk storage container;
   a milk suction pipe fluidly connected to said milk storage container;
   milk level sensor means for sensing the level of milk in said milk storage container, said milk level sensor means being located inside the milk storage container and including a float with a magnet;
   computing means associated with the milk storage container for performing various computations;
   milk level identifying means for identifying the milk level in the milk storage container, said milk level identifying means including a first group of switch devices installed one above the other along the height of the milk storage container, said switch devices interacting with the magnet of the float and being connected to respective inputs of said computing means; and a programming unit in the form of a second group of switch devices in the milk storage container and spaced from each other by a distance equal to the value of the optimum animal feed ration corresponding to the index of their individual productivity, the switch device of the second group being connected to the respective inputs of the computing means.

2. A device according to claim 1, further including stabilizing means for stabilizing the milk level in the milk storage container, said stabilizing means including an elastic sucker secured to the base of the container.

3. A device according to claim 1, wherein said milk storage container has a bottom with a recess in a central part thereof for containing said programming unit, with the size of the recess exceeding the size of the float.

* * * * *